United States Patent
Ludwig et al.

(10) Patent No.: US 8,257,487 B2
(45) Date of Patent: Sep. 4, 2012

(54) HYDRAULIC BINDING AGENT

(75) Inventors: Horst-Michael Ludwig, Karlstadt (DE); Thomas Neumann, Karlstadt-Karlburg (DE)

(73) Assignee: Constuction Research & Technology GmbH, Trostberg (DE)

( * ) Notice: Subject to any disclaimer, the term of this patent is extended or adjusted under 35 U.S.C. 154(b) by 1181 days.

(21) Appl. No.: 11/911,720

(22) PCT Filed: Mar. 13, 2006

(86) PCT No.: PCT/EP2006/002277
§ 371 (c)(1),
(2), (4) Date: Apr. 11, 2008

(87) PCT Pub. No.: WO2006/111225
PCT Pub. Date: Oct. 26, 2006

(65) Prior Publication Data
US 2009/0107364 A1    Apr. 30, 2009

(30) Foreign Application Priority Data
Apr. 19, 2005 (DE) .......................... 10 2005 018 100

(51) Int. Cl.
*C04B 22/06* (2006.01)
(52) U.S. Cl. ......... 106/713; 106/738; 106/819; 264/333
(58) Field of Classification Search ................... 106/713, 106/738, 819; 264/333
See application file for complete search history.

(56) References Cited

FOREIGN PATENT DOCUMENTS

| | | |
|---|---|---|
| DE | 69721121 T2 | 4/2003 |
| DE | 69627279 T2 | 1/2004 |
| JP | 2001114542 | 4/2001 |
| JP | 2003246657 | 9/2003 |
| JP | 2003-277111 * | 10/2003 |
| JP | 2005047735 | 2/2005 |
| WO | 2005037730 A1 | 4/2005 |

OTHER PUBLICATIONS

"STudy on the accelerating effect of finely ground calcium hydroxide on the setting of portland cement", Kato et al., Semento, Konkurito Ronbunshu (2005), Vol. Date 2004, 58,17-22. abstract only.*
JP 2003277111 abstract only (Watanabe et al.) Oct. 2, 2003.*
DD 259187 (Bauer et al.) Aug. 17, 1988. abstract only.*
Machine Translation in English Language for JP 2003-277111 Oct. 2003 Japan, Watanabe et al., pp. 1-10.*

* cited by examiner

*Primary Examiner* — Paul Marcantoni
(74) *Attorney, Agent, or Firm* — Schwabe, Williamson & Wyatt, P.C.

(57) ABSTRACT

The invention relates to a hydraulic binding agent comprising a binding agent component having free-flowing or solidifying properties when water is added and an acceleration component which is used to accelerate solidification. The acceleration component contains ultrafine calcium hydroxide having a high specific surface and low grain size.

25 Claims, 1 Drawing Sheet

1. without acceleration component
2. Embodiment 1
3. Embodiment 2

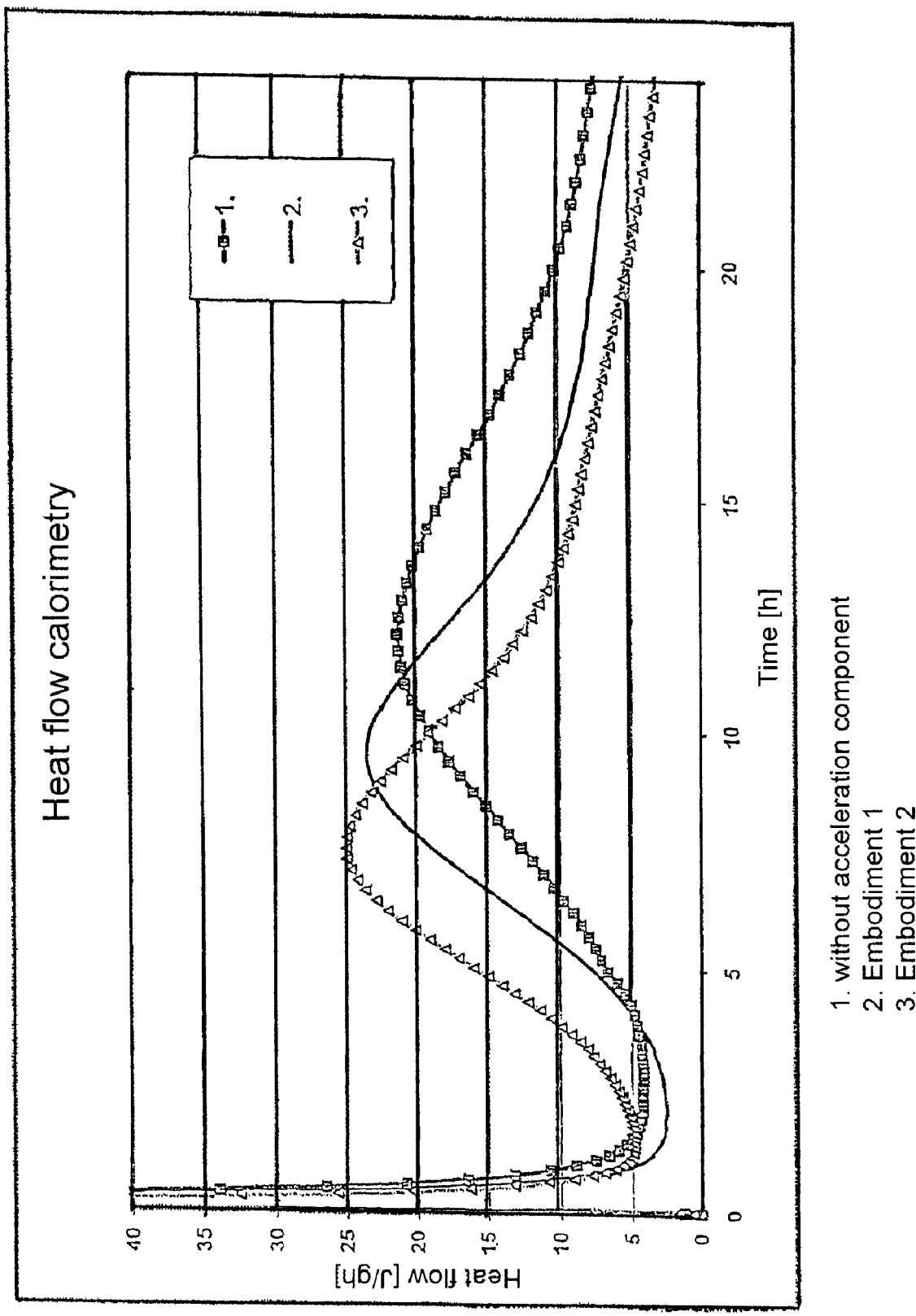

HYDRAULIC BINDING AGENT

CROSS REFERENCE TO RELATED APPLICATIONS

The present application is a national phase entry of, and claims priority under 35 U.S.C. §120 to, International Patent Application No. PCT/EP2006/002277, originally filed Mar. 13, 2006 based on German Application No. 10 2005 018 100.7, originally filed Apr. 19, 2005, entitled "Hydraulic Binding Agent" and which designates the United States of America, the entire content and disclosure of which is hereby incorporated by reference in its entirety.

TECHNICAL FIELD

The invention at hand concerns hydraulic binders having a binder component that is capable of flowing and setting following the addition of water, and an accelerator component serving to accelerate the hardening process, as well as concrete building parts produced using such binders, methods for the manufacture of such concrete building parts and the use of such a binder to produce mortar or concrete.

BACKGROUND

The need for a rapidly hardening hydraulic binder for the production of concrete has been known for a long time. Up to now, this need was satisfied either by special quick-setting cements per se or quick-setting cements on the basis of mixed cements with additives. Many of these products are used today in the areas of repair, civil engineering or in the area of interior work, such as, e.g., plaster, mortar or screed systems.

The special quick-setting cements per se can be classified into cements which are produced based on a modified Portland cement, and special cements, the clinker base of which is clearly different from the Portland cement.

In the area of quick-hardening, modified Portland cements can be produced from Portland cement clinkers specially burned for this application case.

In contrast to normal Portland cement clinkers, these clinkers are distinguished by high lime standards—in general >100—and high silicate moduli—in general >3. As a result, the tricalcium silicate ($C_3S$) content, which is essentially responsible for the early strength development of the cement, is markedly increased as compared to normal Portland cements. The cements produced from these clinkers achieve an early strength that is up to 20% higher than that of the normal Portland cements.

The group of modified Portland cements also includes cements which contain no or only very little sulphate carrier (generally calcium sulphate) as setting regulator. If necessary, the $C_3A$ content is increased with the respective clinkers. These cements cause the rapid setting of the concrete or mortar and are therefore used predominantly in the area of gunite. Often, non-alkaline accelerators, such as aluminum sulphate or aluminum hydroxide, or alkali-containing accelerators based on alkali hydroxides, alkali liquid glass or other alkali salts are added in order to increase the green strength. Since these cements essentially accelerate only the setting process, but not the actual strength development, they should be only conditionally assigned to the group of quick-setting cements.

Special cements used to accelerate the hardening process differ from the Portland cements by a different composition of the clinker that forms their basis. Typical representatives of this group of cements are aluminous cements, sulphoaluminate cements and regulated set cements.

Aluminous cement or high alumina cement is also often referred to as calcium aluminate cement. The humidity-determining clinker phases are monocalcium aluminate (CA), calcium dialuminate ($CA_2$) and mayenite ($C_{12}A_7$). The silica based clinker phases ($C_2S$ and $C_2AS$) that are also present contribute insignificantly to the strength. Aluminous cements can reach extremely high compressive strengths within the shortest amount of time even at low temperatures. Compressive strengths of up to 60 N/mm² after 24 hours can be attained unerringly with these cements. The two hydrate phases $CAH_{10}$ and $C_2AH_8$ that are formed are responsible for this high early strength. In the course of time, these hydrate phases transform into thermally stable $C_3AH_6$ favored by humidity and temperatures of >23° C. The transformation is associated with a strong increase in porosity and release of water and is the cause of a strong reduction of strength. Based on this background information, aluminous cements may not be used for construction engineering buildings in accordance with EN 206-1:2001-07 or DIN 1045-2:2001-07.

Among the areas of application of aluminous cements are, in particular, fireproof materials, well cement formulations and the area of building chemistry.

Calcium sulphoaluminate cements or calcium aluminate sulphate cements contain calcium aluminate sulphate $C_4A_3S$, dicalcium silicate ($C_2S$) and calcium aluminate ferrite ($C_2(A, F)$) as main clinker phases. Depending on the raw mix composition, larger quantities of magnesium, fluoride or iron can be integrated into the clinker phases. In the early hydration, large amounts of ettringite and monosulphate are formed, which result in a considerable early strength (at times up to 30 N/mm² after 3 hours). Due to the volume expansion occurring in the course of hydration, these cements are often used as shrinkage compensators, e.g., in screeds. Structural components made from this cement tend to exhibit rapid carbonation accompanied by considerable loss of strength. Contrary to the uses of Portland cement, the reinforcing steel or prestressing steel in structural parts made from this cement are not protected from corrosion. In general, these cements are only used in blends with other cements.

Regulated set cement or jet cement or calcium aluminate fluoride cement contains primarily the fluoroaluminate-containing phase $C_{11}A_7.CaF_2$ and gypsum, in addition to the main clinker phase $C_3S$. Most of the time, these cements also contain a lime component. During hydration, the fluoroaluminate forms large quantities of ettringite and is responsible for the high early strength of up to 16 N/mm² after one hour. In order to prevent overly rapid setting of the concrete or mortar, setting retarders are often added. This cement was able to hold its ground only in niche products on the market. Structural components made from this cement exhibited poor durability on exterior surfaces.

In addition to the above-named special cements, there are also some early high-strength cements based on alinite ($C_{11}A_7.CaCl_2$). However, these cements hardly have a practical significance due to their corrosion-promoting effect with respect to reinforcing steel.

In most cases, more rapidly hardening hydraulic binders are produced as mix cements with various additives. The basis of these systems is always a Portland cement or Portland cement clinker.

The vast majority of these mix cements contains additives which stimulate the aluminatic and/or alumino-ferrite clinker phases and thus accelerate the formation of ettringite, monosulphate or even calcium aluminate hydrate. By the addition of soluble aluminum compounds (e.g., aluminum sulphate, aluminum hydroxide) or an aluminous cement component, the portion of strength-forming hydrate phases can be further increased.

Alkali carbonates, fruit acids or sulfonates are often used to accelerate hardening. In addition, to control the processing properties and strength development characteristics, various additives (e.g., fly ashes, microsilica, metakaolin) and/or admixtures (liquefier, phosphate retarders or the like) are added.

In the following, a number of examples of patented mix cements based on Portland cement are presented.

In EP 0517869 B1, a system based on Portland cement is described. In order to be able to generate high strengths, the portion of $C_4AF$ should be greater than 9.5%. A carbonate donor is added to the system as $K_2CO_3$, -bicarbonate or -trihydrate as well as tricalcium citrate monohydrate (if necessary blended with dipotassium oxalate monohydrate). Using this system, strengths of up to 20 N/mm$^2$ can be attained after 4 hours.

DE 4223494 C2 describes a system based on Portland cement having a small portion of aluminous cement and additives of sodium carbonate, sodium sulphate, calcium hydroxide, lithium carbonate, Kann tartate and Ca lignine sulfonate. Strengths of up to 7 N/mm$^2$ are achieved after one hour.

In DE 4313148, an accelerated system is described which consists of Portland cement, microsilica or metakaolin, sodium citrate and lignine or naphthaline sulfonate. Strengths of up to 4 N/mm$^2$ are achieved after one hour.

DE 10141864A1 describes a quick-setting cement binder mixture consisting of extremely fine powder of Portland cement clinker, gluconic acid or gluconate, alumina hot melt cement and, if necessary, further additives. The attainable strength can be over 20 N/mm$^2$ after 4 hours.

The acceleration of the systems via the increased formation of calcium aluminate hydrate, ettringite and/or monosulphate accounts for a reduced durability in certain partial areas of the respective concretes. Furthermore, such binders can bring about undesired brown colorations on the concrete surface due to the complexation of iron caused by the alkali carbonates and/or the hydroxycarboxylic acids. And last but not least, a number of substances used to regulate the systems result in an increased hygroscopic moisture absorption of the cement and thus reduce its suitability for storage.

Therefore, these products could not establish themselves in the area of concrete construction engineering. But they are used in the area of repairs and maintenance, in the area of the plaster and mortar industry and in the area of building chemistry.

The accelerated formation of the C—S—H phases that are decisive for the development of strength is far more effective than an acceleration of the aluminate and/or aluminate ferritic reaction, which result in hydrate phases with limited strength potential.

The acceleration of the formation of C—S—H phases can be realized in the mix cement by the use of salts which increase the solubility product with respect to calcium. This includes halogenides, pseudohalogenides, nitrates, nitrides and formiates. The respective calcium salts and salts with other polyvalent cations are especially suited with respect to acceleration. Alkali cations reduce the solubility product with respect to calcium and oppose an accelerated formation of C—S—H phases.

Of the above-mentioned substances, the halogenides have the greatest effect on the formation of the C—S—H phases. Due to the excellent availability and the low cost, calcium chloride was used in the past to accelerate cement hydration.

But it turned out that the chlorides and the other halogenides significantly promote the corrosion of pre-stressing steels and reinforcement steels. For this reason, these substances may only be used for constructive steel and prestressed concrete, specifically in accordance with EN 206-1:2007-07. In addition, these accelerators result in markedly reduced final strengths and an insufficient durability of the parts made from them. But the accelerating effect is less developed with the pseudohalogenides, nitrates, nitrides and formiates. However, these salts can also promote the corrosion of the stressed or unstressed steels in the concrete. Their application for steel or prestressed concrete is limited and is subject to the respective national regulations in the area of the CEN states. Thus, for example, in Germany, only formiate may be used to accelerate the hardening process in steel concrete constructions. Its use for prestressed concrete is prohibited.

The use of gypsum as a hardening accelerator is problematic due to the ettringite formation with respect to the usually targeted durability and strength of the concrete under stress.

Another quick-setting, cement-based hydraulic binder exhibiting low shrinkage, in particular for plasters and screeds, is known from DE 197 54 826 A1. In accordance with this publication, the ettringite problem is to be solved by affecting a specific ettringite formation early on by the separate addition of a reactive $CaSO_4$ compound and by the fact that, if possible, no secondary ettringite is formed following the hardening phase.

However, the setting properties of this known binder are not yet satisfactory.

In addition—specifically in terms of the production of concrete building parts, specifically prefabricated concrete parts—no quick set cement is known which allows the completion of an entire concreting process, including rapid form stripping and loading of the concrete building parts within one work shift under normal conditions. Therefore, there is a lack of a hydraulic binder which provides risk-free satisfaction of the requirements of concrete production and/or which has the desired economic properties of the concrete made from the binder.

BRIEF DESCRIPTION OF THE DRAWING

Embodiments of the invention are explained below with reference to the drawing, to which reference is made with respect to all details that are material to the embodiments.

The drawing FIGURE illustrates the heat flow calorimetry of embodiments of hydraulic binders.

DETAILED DESCRIPTION OF EMBODIMENTS OF THE INVENTION

This invention is based on the task of developing a hydraulic binder making it possible to attain a maximum early strength of the product made from it.

According to the invention, this task is solved in a surprisingly simple manner by a hydraulic binder. The extremely fine calcium hydroxide present in the accelerator component of hydraulic binders in accordance with the invention exhibits a large surface, i.e., a specific surface (BET surface in accordance with DIN 66132) of 15 m$^2$/g or more, specifically 25 m$^2$/g or more, and/or consists of 40 mass percent or more, preferably 70 mass percent or more, of particles of a particle size of 20µ or less. Based on this extremely high specific surface of the calcium hydroxide, there are sufficient seed crystals available in accordance with the invention for the C—S—H phases, whose formation is decisive as a strength-determining factor of the cement hydration. Therefore, the formation of the C—S—H phases can take place in an accelerated fashion and a high early strength of the respective concrete can be achieved rapidly.

This comes as a surprise as "Tagung Bauchemie" [Building Chemistry Conference], Erlangen, 2004, pages 135-139, still notes that calcium hydroxide has only a small effect on the nucleation of the strength-determining C—S—H phases.

In accordance with the invention, the production of such a hydraulic binder is very simple because superfine calcium hydroxide, which is usually used as slaked lime for flue gas cleaning, is commercially available.

The concrete produced from embodiments of the hydraulic binder meets all application-related requirements in terms of processing time, final strength and durability. Specifically, all requirements in accordance with EN 206-1:2007-07 or DIN 1045-2:2001-07 are met.

In general, the effect of the accelerated hardening is increased the larger the specific surface of the calcium hydroxide. In a preferred embodiment of this invention, the calcium is to have a specific surface of 30 $m^2/g$ or more, not to exceed, however, 100 $m^2/g$, preferably 75 $m^2/g$, and specifically 50 $m^2/g$, so as to limit the tendency to sintering or to increasing the surface energy of the particles, which promotes agglomerate formation. In a further preferred embodiment, the superfine calcium hydroxide is to consist of 40 mass percent or more of particles of a particle size of 1 to 10 μm, preferably 3 to 5 μm, and/or 70 mass percent of particles of a particle size of 4 to 16 μm, preferably 8 to 12 μm.

In a preferred embodiment, it is provided that the accelerator component is present in a fraction, relative to the hydraulic binder, of 1 to 15 mass percent, preferably 3 to 10 mass percent, specifically 4 to 6 mass percent. Specifically, this fraction can be controlled without problems and can be selected expeditiously depending on the specific requirement.

In another preferred embodiment, the accelerator component is to be present in dry, powdery form for practical reasons (storage). In principle, the accelerator component can be combined with any binder component that is capable of flowing and setting after the addition of water; but embodiments in which the binder component contains and/or preferably consists of Portland cement CEM I and/or a composite cement CEM II are especially preferred.

Increased grinding of the cement generally results in higher early strength. However, the higher water content necessarily accompanying the increased grinding fineness of the cement results in a decrease of the early and final strength, i.e., the advantageous effect of the increased cement grinding is limited. In a preferred embodiment, this grinding fineness is to be 3000 to 7000 $cm^2/g$ (in accordance with Blaine), preferably 4000 to 6000 $cm^2/g$.

Despite the acceleration, the significant strength-forming phase in the Portland cement remains the alite or the tricalcium silicate $C_3S$.

Therefore, the binder component should exhibit a $C_3S$ portion of 50 to 75 mass percent, preferably 55 to 65 mass percent (always relative to the cement clinker portion) in a preferred embodiment.

In another preferred embodiment, an alkali content, expressed as sodium equivalent, of 1.8 mass percent or less, preferably 1.2 mass percent or less is selected in the binder based on the hygroscopic properties of some alkali compounds which can reduce the storability. The selection of the binder component is generally dependent on the specific requirements of the respective concrete. In a preferred embodiment, the binder component is to be a cement of the fabrication class 52.5 R. The amount in which the hydraulic binder contains the binder component is dependent on the selection of the concentration of the accelerator component and further possible additives; in a preferred embodiment, the fraction of the binder component (relative to the hydraulic binder) is to be 85 to 99 mass percent, preferably 90 to 97 mass percent, specifically 94 to 96 mass percent.

The scope of the invention is to also comprise exclusively those binders in which one or several of its components, specifically the superfine calcium hydroxide, is/are provided with some type of coating.

Furthermore, this invention is to explicitly comprise a binder falling under the scope of the invention, whose accelerator component contains the superfine calcium hydroxide in a form mixed with another substance. The other substance can be, for example, CaO or $CaO_3$.

Products manufactured using binders according to the invention in accordance with various embodiments comprise concrete building parts, specifically prefabricated concrete parts, which preferably satisfy the requirements of EN 206-1:2001-07 or DIN 1045-2:2001-07.

In addition, methods for the manufacture of a building material to which the hydraulic binder of various embodiments is added, are sought to be protected.

Finally, the use of a hydraulic binder in accordance with various embodiments for the production of mortar and concrete in accordance with various embodiments is sought to be protected.

The sole drawing FIGURE illustrates the heat flow calorimetry of embodiments of hydraulic binders.

The advantages of the superfine calcium hydroxide used as accelerator component in accordance with the invention will be explained in the following using two embodiments. For clarification purposes, these embodiments will be compared with a version in which only a binder component is used, here a Portland cement CEM I, 52.5 R, hereinafter referred to as BMK. In an embodiment, an accelerator component, consisting of calcium hydroxide with a specific surface of 20 $m^2/g$ (BET), is used with the binder component also consisting of a Portland cement, i.e., this very same BMK. The fraction of the superfine calcium hydroxide relative to the hydraulic binder is 5%. For the production of the respective concrete, 370 $kg/m^3$ of this binder, 148 $kg/m^3$ water, 1920 $kg/m^3$ aggregate are used, and approx. 4 $kg/m^3$ of a commercially available liquefier is added (so that a flow consistency of ca. 50 cm is attained for the concrete). This concrete attains a compressive strength of 74.5 $N/mm^2$ after 28 days (cf. Table 1), i.e., it meets particularly the commonly required compressive strength and even exceeds the compressive strength of the comparative version, in which no accelerator component was used. Based on the values in Table 1, it can also be seen that an early strength of 10.7 $N/mm^2$ is observed after 6 hours in this embodiment, and an early strength of 27 $N/mm^2$ is observed after 8 hours.

These increased values, as compared to those of the version without accelerator component, result from a respectively increased chemical reaction of the binder during the time interval of 5 to 10 hours, as revealed by the heat flow calorimetry in the drawing. A relevant target value for the early strength of the concrete is 15 $N/mm^2$ because this compression strength is usually sufficient to strip the forms of concrete building components, specifically prefabricated concrete parts. This value is achieved after approx. 6½ hours in various embodiments.

In another embodiment, an accelerator component made from calcium hydroxide is used with a specific surface of 43 $m^2/g$, with the binder component again being BMK Portland cement. The quantitative and mixing ratios of the hydraulic binder with water, the aggregate as well as the liquefier are selected as in the first embodiment. A sufficient final strength is attained here with a 28-day strength of 73.8 N/mm² as well. An advantage of this accelerator component on the basis of a calcium hydroxide with an extremely high BET surface (43 m²/g) is that the rest phase starting subsequent to the mixing of the concrete and characterized by a comparatively slight chemical reaction of the binder, as revealed by the heat flow calorimetry in the drawing, is even more markedly reduced.

The very high early strengths of the concrete made in accordance with embodiment 2, as listed in Table 1, of as much as 25.2 N/mm² after a mere 6 hours show that, in this case, the speedy stripping of forms and loading of a concrete part, specifically a prefabricated concrete part, is possible after less than 6 hours. This allows the completion of a complete concreting process within one shift (ca. 8 hours), i.e., under normal conditions, i.e., without the use of costly and elaborate heat treatments. It is thus possible, for example, to perform the concreting in three-shift operations under normal conditions, which is particularly advantageous when a great number of concrete parts are required in a short amount of time and/or in order for the relatively expensive formwork types to be quickly circulated again.

TABLE 1

Strength progression of the concretes described in the embodiments

| Concrete | Additive | Strength 4 hours | following . . . 6 hours | Data in 8 hours | N/mm² 28 days |
|---|---|---|---|---|---|
| 1. | Without accelerator component | 0.0 | 3.5 | 19.3 | 73.1 |
| 2. | In accordance with embodiment 1 | 2.6 | 10.7 | 27.0 | 74.5 |
| 3. | In accordance with embodiment 2 | 5.1 | 25.2 | 39.0 | 73.8 |

The invention is not limited to the embodiments presented in the drawing. Instead, the use of binders in accordance with the invention with other compositions and for a variety of intended uses is also contemplated.

The invention claimed is:

1. A hydraulic binder comprising:
a binder component that flows and sets after adding water; and
an accelerator component to accelerate the setting, wherein the accelerator component includes superfine calcium hydroxide with a specific surface of at least 15 m²/g and at a maximum of 100 m² μg.

2. The hydraulic binder of claim 1, wherein the specific surface of the superfine calcium hydroxide is at least 30 m²/g.

3. The hydraulic binder of claim 1, wherein the accelerator component includes particles having a particle size of 20 μm or less, and wherein the accelerator component has a particle content of at least 40 mass percent, relative to a total weight of the calcium hydroxide.

4. The hydraulic binder of claim 3, wherein the accelerator component has a particle content of at least 70 mass percent, and wherein the particle size is at least 5 μm.

5. The hydraulic binder of claim 1, wherein the accelerator component includes particles, and wherein the accelerator component has a particle content of at least 40 mass percent of particles having a particle size of at least 1 μm.

6. The hydraulic binder of claim 1, comprising at least 1 mass percent of the accelerator component.

7. The hydraulic binder of claim 1, wherein the accelerator component is present in a dry, powder form.

8. The hydraulic binder of claim 1, wherein the binder component has a fineness of grinding of at least 3000 cm²/g.

9. The hydraulic binder of claim 1, wherein the binder component includes at least one of Portland cement CEM 1 and a composite cement CEM II.

10. The hydraulic binder of claim 1, wherein the binder component includes at least 50 mass percent of tricalcium silicate relative to a cement clinker.

11. The hydraulic binder of claim 10, wherein the binder component includes 75 mass percent or less of tricalcium silicate relative to the binder component.

12. The hydraulic binder of claim 1, comprising an alkali content, expressed as sodium equivalent, of 1.8 mass percent or less relative to the binder component.

13. The hydraulic binder of claim 1, wherein the hydraulic binder is a cement of a strength class of 52.5 R.

14. The hydraulic binder of claim 1, comprising at least 85 mass percent of the hinder component relative to a total amount of the hydraulic binder.

15. The hydraulic binder of claim 1, comprising 99 mass percent or less of the binder component relative to a total amount of the hydraulic binder.

16. The hydraulic binder of claim 1, including one or more component parts including a coating.

17. The hydraulic binder of claim 16, wherein the superfine calcium hydroxide includes the coating.

18. A ready-mix concrete or concrete part such as a road surface, a concrete pole or foundation, comprising a hydraulic binder including:
a binder component capable of flowing and setting after an addition of water; and
an accelerator component to accelerate the setting, wherein the accelerator component includes superfine calcium hydroxide with a specific surface of at least 15 m²/g and at a maximum 100 m²/g.

19. The ready-mix concrete or concrete part of claim 18, wherein the ready-mix concrete or concrete part comprises a prefabricated concrete part.

20. A method for making a building material capable of flowing and setting, comprising:
providing, in a mixing device, raw materials including a hydraulic binder and a selected one or more of a base liquid and at least one additive, wherein the hydraulic binder includes:
a binder component capable of flowing and setting after an addition of water; and
an accelerator component to accelerate the setting, wherein the accelerator component includes superfine calcium hydroxide with a specific surface of at least 15 m²/g and at a maximum 100 m²/g;
uniformly mixing in the mixing device to form a building material that flows and sets;
forming the building material into a shape.

21. The method of claim 20, wherein said providing the building material comprising pouring or injecting the building material.

22. The method of claim 20, wherein said providing the building material comprises providing the building material to a road surface, an area of soil, a building wall, ceiling, or a building floor.

23. The method of claim 20, wherein the at least one additive comprises sand or gravel, and wherein the base liquid comprises water.

24. The method of claim 20, wherein the building material comprises mortar or concrete.

25. The method of claim 20, wherein the additive comprises a liquefier, and wherein the building material comprises a liquid mortar.

* * * * *